(No Model.)
T. B. OSBORNE.
MIDDLINGS PURIFIER.
No. 254,038. Patented Feb. 21, 1882.
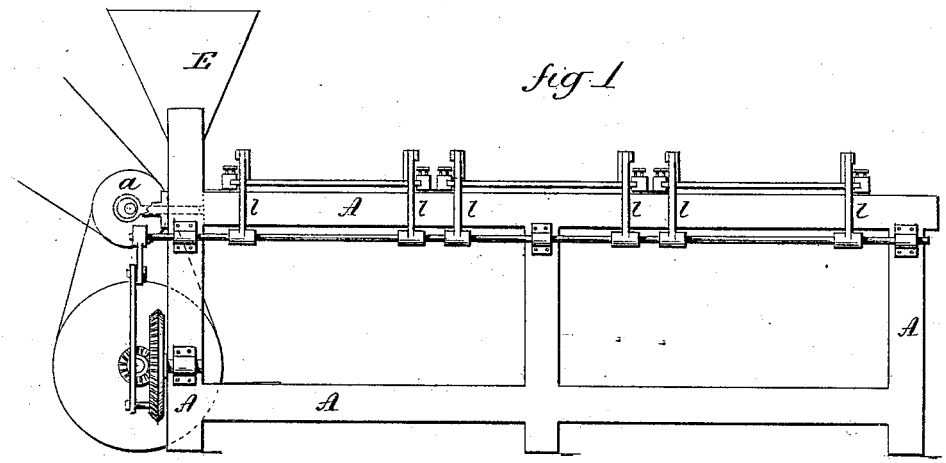
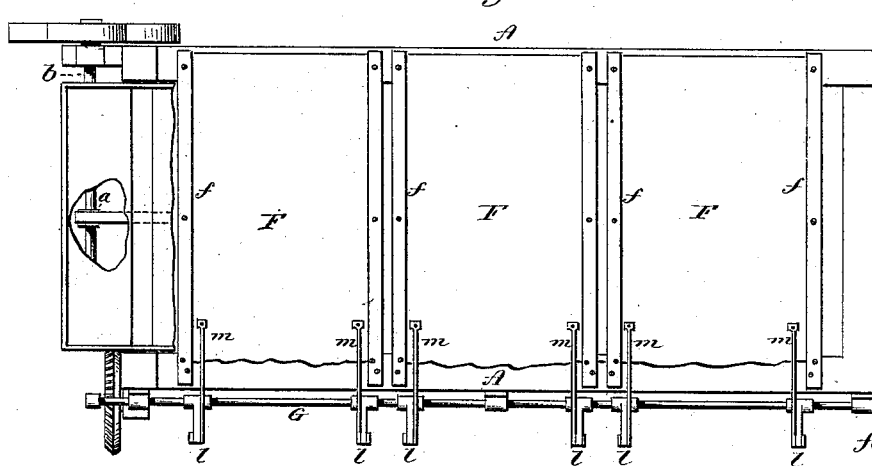
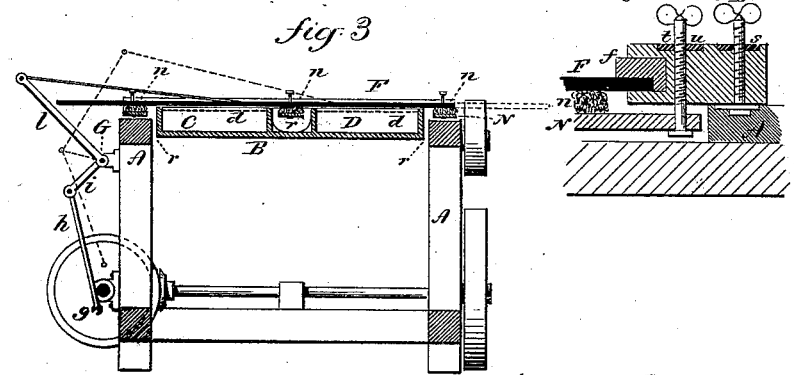
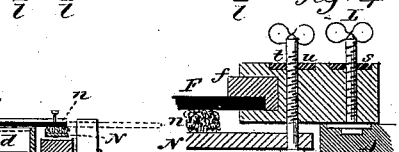
Witnesses:
Thomas B. Osborne,
Inventor.

UNITED STATES PATENT OFFICE.

THOMAS B. OSBORNE, OF NEW HAVEN, CONNECTICUT.

MIDDLINGS-PURIFIER.

SPECIFICATION forming part of Letters Patent No. 254,038, dated February 21, 1882.

Application filed December 19, 1881. (No model.)

*To all whom it may concern:*

Be it known that I, THOMAS B. OSBORNE, of New Haven, in the county of New Haven and State of Connecticut, have invented a new Improvement in Middlings-Purifiers; and I do hereby declare the following, when taken in connection with the accompanying drawings and the letters of reference marked thereon, to be a full, clear, and exact description of the same, and which said drawings constitute part of this specification, and represent, in—

Figure 1, a side view; Fig. 2, a top plan view; Fig. 3, a transverse sectional view; Fig. 4, a detached view, enlarged.

This invention relates to an improvement in apparatus for separating the lighter particles from ground or broken wheat or other grain or material, which particles depreciate the quality of the flour if permitted to remain, such apparatus being commonly known as "middlings-purifiers." My present invention employs the principal features of the invention for which Letters Patent were granted to me, dated February 17, 1880, No. 224,719. In that patent I employed rolls arranged and presenting an electrified surface over the material to be operated upon, which moves in an agitated state beneath the revolving rolls, so that the lighter particles are attracted to the electrified surface of the rolls, and by the movement of the rolls are taken away and stripped from the belt.

My invention consists in the combination and arrangement of mechanism, as hereinafter described, and more particularly recited in the claims.

A is the frame on which the apparatus is supported.

B is the carriage which receives and carries the grain to be purified. It is arranged in suitable guides, and is provided with means to impart to it a rapid reciprocating movement, or such as shall give to the material it carries an agitation. This is best done by means of an eccentric, $a$, on the driving-shaft $b$, in connection with the carriage or receiver, as seen in Figs. 1 and 2. This shaft, revolving rapidly, imparts a short, rapid, reciprocating movement, such as will give to the material it carries the required agitation. I have here represented the carriage as divided longitudinally into two parts, C D. Across the top of each of these two parts is a sieve-cloth, $d$. (See Fig. 3.)

E is the hopper, into which the ground material is placed and from which it is delivered onto the sieve-cloth on the carriage, and by the agitation given to the carriage the material so delivered passes along over the surface of the sieve-cloth.

Transversely across the machine are plates F, more or less in number, arranged to move in suitable guides, $f$. These plates are preferably made from hard rubber, or so as to present a surface of hard rubber upon their under side or other surface which may be electrified. To these plates a reciprocating movement back and forth across the machine is imparted by means of a crank, $g$, which operates a rock-shaft, G, through a pitman, $h$, and lever $i$. From the rock-shaft levers $l$ extend upward, and from them connecting-rods $m$ extend into connection with the plates, so that the oscillating movement which is imparted to the rock-shaft G will communicate the requisite back-and-forth movement to the plate, as from the position seen in Fig. 3 to the position seen in broken lines, same figure.

At each side and at the center brushes $n$, of wool, cat-skin, or other material which will properly electrify the surface of the plates, are arranged stationary, (here represented as one at each side, and the third in the middle between the two compartments,) and so that as the plates reciprocate their surface passes in contact with the said brushes. The material passing beneath these plates as the material did beneath the belt in my former patent, the lighter particles are brought to the surface by the carriers, and are attracted from the mass to the under surface of the plates, and, attaching themselves to the plate, are carried to the one side or the other, according to the direction in which the plate is moved. The particles thus carried on the plates come in contact with the brushes—or it may be a stripper—forward of the brushes—that is, between the brushes and the sides of the compartments. Coming in contact with the brushes or stripper, the particles are dislodged and fall from the surface of the plate into receptacles $r$ beneath, from whence they are removed by traveling brushes or otherwise. Going in one direction, the material is removed by the brush or stripper toward which the plate is moving. Then, returning, they are removed by the brush or stripper upon the opposite side. In this case the central brush has a brush to remove the particles in both directions.

Instead of the rapid reciprocating movement which is imparted to the carriage for the purpose of agitation, other devices may be applied to produce the same result. Other mechanism may also be applied to impart the reciprocating movement to the plates, and where several are used they may all move together, as in this case, or the reciprocating movement may be imparted to each in a different time, it only being essential to this invention that the electrified plate or plates shall reciprocate above the surface of the material to be ground, and provided with some device to remove the particles from the surface which have been attracted there by the plate.

It is desirable to adjust the relation of the plates to the material passing beneath them, as well as of the brushes to the plates. To this end the guides $f$, in which the plates F reciprocate, are held in place by adjusting-screws L. (See Fig. 4.) The screw running down through the guide, its lower end is held in the frame so as to prevent its vertical movement, the screw is threaded, and passes through a nut, $s$, in the top of the guide. Hence by turning the screw the guide may be lowered or raised, so that its level or position relative to the material passing beneath it may be adjusted.

The brushes $n$ are arranged upon a bar, N, (see Fig. 4,) and this bar is held to the guides by means of an adjusting-screw, $t$, working through a nut, $u$, in the guide, so that by turning the screw the brush-bar may be raised or lowered to increase or reduce the pressure of the brush upon the plate.

It will be understood from the foregoing that I do not here broadly claim passing the ground material in an agitated condition beneath a movable electrified surface, as that is secured to me in my former patent; but What I do claim is—

1. The combination of a receiver arranged and operated to agitate the ground material passing thereon, one or more plates arranged substantially parallel with the surface of the moving material and so as to present an electrified surface to the passing material, guides for said plates arranged transversely across the receivers, and mechanism, substantially such as described, to impart to said plates a reciprocating movement, substantially as described.

2. The combination of a receiver arranged and operated to agitate the ground material passing thereon, one or more plates arranged substantially parallel with the surface of the moving material and so as to present an electrified surface to the passing material, guides for said plates arranged transversely across the receivers, mechanism, substantially such as described, to impart to said plates a reciprocating movement, and brushes to electrify the working-surface of the said plates, substantially as described.

3. The combination of a receiver arranged and operated to agitate the ground material passing thereon, one or more plates arranged substantially parallel with the surface of the moving material and so as to present an electrified surface to the passing material, guides for said plates arranged transversely across the receivers, mechanism, substantially such as described, to impart to said plates a reciprocating movement, and strippers to take the particles from the plate which have been attracted to it in its passage over the moving material, substantially as described.

4. The combination of a receiver arranged and operated to agitate the ground material passing thereon with one or more plates arranged substantially parallel with the surface of the moving material and so as to present an electrified surface to the passing material, guides for said plates arranged transversely across the receiver, and mechanism, substantially such as described, to impart to said plates a reciprocating movement, the said guides made adjustable, whereby the position of the reciprocating plates relative to the material over which they pass may be adjusted, substantially as described.

5. The combination of a receiver arranged and operated to agitate the ground material passing thereon, one or more plates arranged substantially parallel with the surface of the moving material and so as to present an electrified surface to the passing material, guides for said plates arranged transversely across the receivers, mechanism, substantially such as described, to impart to said plates a reciprocating movement, and brushes to electrify the working-surface of the said plates, said brushes made adjustable with relation to the plates, substantially as described.

THOMAS B. OSBORNE.

Witnesses:
HENRY S. DURAND,
JOS. C. EARLE.